Patented June 23, 1942

2,287,700

UNITED STATES PATENT OFFICE 2,287,700

RUBBER COMPOSITION

Irving E. Muskat and Frederick Gage, Akron, Ohio, assignors to Pittsburgh Plate Glass Company, Allegheny County, Pa., a corporation of Pennsylvania No Drawing. Application October 19, 1939, Serial No. 300,202

7 Claims. (Cl. 260—765)

This invention relates to the compounding of rubber and to novel rubber compositions. In accordance with the present invention, we have discovered that desirable rubber products may be prepared by incorporating finely divided precipitated calcium silicate of the proper particle size and composition into rubber and vulcanizing the mixture. It is found that this calcium silicate acts as a reinforcing pigment which improves the strength of the composition.

The particle size and composition of the calcium silicate are found to be of considerable importance. For most cases the silicate should have an average ultimate particle size less than one micron, preferably not substantially in excess of 0.5 micron. While a small quantity of agglomerates or particles greater in diameter than one micron may be present, it is preferred that a preponderance of the particles generally not less than about 96 percent of the pigment particles be under one micron in size.

For satisfactory results the molecular ratio of $SiO_2$ to CaO in the silicate should not be less than about 2 and preferably is maintained above about 3, optimum results being obtained when the ratio is about 3.3. Products wherein the ratio of $SiO_2$ to CaO is 1.5 or below, become extremely hard upon drying and agglomerate to an undesirable degree. Consequently, such products do not disperse readily in rubber and do not yield suitable rubber compositions.

The method of preparing the calcium silicate also is of importance. In accordance with the present invention, it is found essential to prepare the silicate by precipitation from an aqueous solution of a soluble calcium salt. Calcium chloride is found to be most suitable for this purpose although other salts such as calcium nitrate or acetate may be used. While the calcium silicate may be prepared from calcium hydroxide slurries, the product is not as suitable as that obtained from salt solutions and often fails to cure satisfactorily. The precipitation is conducted by interaction of the calcium salt with a suitable soluble silicate such as sodium or other alkali metal silicate. In order to avoid the formation of hard products which agglomerate upon drying it is found desirable to precipitate the silicate from a concentrated solution containing not substantially less than 50 grams and preferably at least 75 grams of calcium chloride per liter, using sodium silicate solutions of about 100 grams $SiO_2$ per liter of solution and thereby to form a slurry containing not substantially less than 25 grams and preferably not in excess of 125 grams of calcium silicate per liter of slurry. While some departure from these conditions is possible, it is found preferable to adjust concentrations of calcium chloride within the specified range to insure formation of a suitable pigment.

The temperature of precipitation should be maintained at room temperature or above for most cases. The precipitated silicate may be recovered by decantation and/or filtration and dried at a temperature sufficiently high to remove any water which may otherwise be given off during vulcanization, for example, about 150° C. or above. Generally the product is dried at a temperature approximating vulcanizing temperature. The dried product is found to be very white and to have an average particle size below one micron. In general, it contains a quantity of water probably in the form of water of crystallization generally not in excess of 25 percent. This water is tenaciously retained by the silicate and is not given off during vulcanization, nor does it injure the rubber composition in which the silicate is incorporated.

The calcium silicate produced in accordance with the present invention may be used in either hard or soft rubber products. It is found that rubber products containing the calcium silicate prepared in accordance with the present invention are more resistant to tear and abrasion than most compositions and are particularly adapted for rubber heel stock. Particularly desirable hard rubber compositions may be secured by use of large quantities of the silicate which may be incorporated without loss of strength of the rubber. Thus, very effective rubber compositions having high wear resistance have been secured containing from 25 to 150 parts of the calcium silicate per 100 parts of rubber.

The following example is illustrative:

A quantity of calcium silicate was prepared by agitating an aqueous solution containing 100 grams per liter of calcium chloride with aqueous solution of sodium silicate having the formula $Na_2O(SiO_2)_{3.36}$ at a temperature of 25° C. This sodium silicate solution contained 100 grams per liter $SiO_2$. The mixture was vigorously agitated for 45 minutes to prevent agglomeration, after which the calcium silicate was recovered by filtration and was washed, dried at a temperature of 105° C. and finally pulverized and screened to produce a product having an average particle size less than one micron. The ratio of $SiO_2$ to CaO in this silicate was approximately 3.36.

Using the resulting calcium silicate the followlowing composition was compounded:

| | Parts |
|---|---|
| Smoked sheets | 100 |
| Zinc oxide | 10 |
| Stearic acid | 3 |
| Sulfur | 3 |
| Mercapto-benzothiazole | 1 |
| Calcium silicate | 125 |

The composition was vulcanized at a temperature of 287° F. and the vulcanized product exhibited great wear and abrasion resistance.

While the invention has been described with particular reference to rubber compositions, it may be applied to synthetic rubber compositions such as "Thiokol" or other ethylene polysulphide polymers, polymerized chloroprene, butadiene polymers, etc.

Although the present invention has been described with reference to specific details of certain embodiments thereof, it is not intended that such details shall be regarded as limitations upon the scope of the invention except insofar as included in the accompanying claims.

We claim:

1. A rubber composition comprising rubber and a suitable quantity of a finely divided precipitated calcium silicate having an average particle size not substantially in excess of about one micron, the molecular ratio of $SiO_2$ to CaO in said silicate being not less than about 2 to 1.

2. A rubber composition comprising rubber and a suitable quantity of a finely divided precipitated calcium silicate having an average particle size not substantially in excess of about one micron, the molecular ratio of $SiO_2$ to CaO in said silicate being not less than about 3 to 1.

3. The product resulting from the vulcanization of a composition comprising 100 parts of rubber and not substantially less than 25 parts of a precipitated calcium silicate, said silicate having an average particle size not in excess of about one micron, the molecular ratio of $SiO_2$ to CaO in said silicate being not less than about 2 to 1.

4. A composition comprising a compound of the group consisting of rubber and synthetic rubber compositions, and a substantial quantity of a finely divided precipitated calcium silicate having an average particle size not substantially in excess of about one micron, the molecular ratio of $SiO_2$ to CaO in said silicate being not less than about 2 to 1.

5. A rubber composition comprising rubber and a suitable quantity of a finely divided precipitated calcium silicate having an average particle size not substantially in excess of about one micron, the molecular ratio of $SiO_2$ to CaO in said silicate being about 3.3 to 1.

6. The product of claim 1 wherein the molecular ratio of $SiO_2$ to CaO is no more than about 3.36 to 1.

7. The composition of claim 4 in which the synthetic rubber composition is a butadiene polymer.

IRVING E. MUSKAT.
FREDERICK GAGE.